(12) United States Patent
Culbert et al.

(10) Patent No.: US 6,738,544 B2
(45) Date of Patent: May 18, 2004

(54) THERMALLY-SHAPED OPTICAL FIBER AND A METHOD FOR FORMING THE OPTICAL FIBER

(75) Inventors: John M. Culbert, Round Rock, TX (US); Robert Mays, Jr., Austin, TX (US)

(73) Assignee: Megladon Manufacturing Group, Austin, TX (US)

( * ) Notice: Subject to any disclaimer, the term of this patent is extended or adjusted under 35 U.S.C. 154(b) by 6 days.

(21) Appl. No.: 10/167,071

(22) Filed: Jun. 11, 2002

(65) Prior Publication Data

US 2003/0228099 A1 Dec. 11, 2003

(51) Int. Cl.$^7$ .................................................. G02B 6/32
(52) U.S. Cl. ...................... 385/33; 385/124; 264/1.26; 359/653; 65/387
(58) Field of Search .............................. 385/15, 27, 31, 385/33–35, 38, 39, 50, 124, 123; 359/652–655; 264/1.1, 1.24, 1.25, 1.26, 1.32; 65/387, 415

(56) References Cited

U.S. PATENT DOCUMENTS

| | | | |
|---|---|---|---|
| 4,159,863 A | * 7/1979 | Stewart | 385/33 |
| 4,710,605 A | 12/1987 | Presby | |
| 4,932,989 A | 6/1990 | Presby | |
| 5,011,254 A | 4/1991 | Edwards et al. | |
| 5,256,851 A | 10/1993 | Presby | |
| 5,446,816 A | 8/1995 | Shiraishi et al. | |
| 5,457,759 A | * 10/1995 | Kalonji et al. | 385/31 |
| 5,563,969 A | * 10/1996 | Honmou | 385/35 |
| 5,677,778 A | 10/1997 | Kanterakis et al. | |
| 5,699,464 A | 12/1997 | Marcuse et al. | |
| 5,751,871 A | * 5/1998 | Krivoshlykov et al. | 385/33 |
| 5,772,720 A | 6/1998 | Taira-Griffin et al. | |
| 5,774,607 A | * 6/1998 | Shiraishi et al. | 385/33 |
| 5,809,198 A | 9/1998 | Weber et al. | |
| 5,935,288 A | 8/1999 | DiGiovanni et al. | |
| 6,246,026 B1 | 6/2001 | Vergeest | |
| 2002/0076157 A1 | * 6/2002 | Kropp | 385/38 |
| 2002/0191911 A1 | * 12/2002 | Ukrainczyk et al. | 385/33 |
| 2003/0165292 A1 | * 9/2003 | Bhagavatula et al. | 385/33 |

FOREIGN PATENT DOCUMENTS

| | | | |
|---|---|---|---|
| EP | 155379 A2 | * 9/1985 | ............ G02B/6/42 |
| WO | WO 99/59766 | 11/1999 | |
| WO | WO 99/60192 | 11/1999 | |
| WO | WO 00/02700 | 1/2000 | |
| WO | WO 00/05026 | 2/2000 | |
| WO | WO 00/28359 | 5/2000 | |
| WO | WO 00/32327 | 6/2000 | |

OTHER PUBLICATIONS

U.S. patent application Ser. No. 09/692,991, Mays, filed Oct. 20, 2000.

* cited by examiner

Primary Examiner—Hemang Sanghavi
Assistant Examiner—Scott A Knauss
(74) Attorney, Agent, or Firm—Kenneth C. Brooks (57) ABSTRACT

A thermally-shaped optical fiber and a method for forming the same so as to minimize the presence of optical artifacts in the optical fiber that contributes to insertion loss.

20 Claims, 8 Drawing Sheets

THERMALLY-SHAPED OPTICAL FIBER AND A METHOD FOR FORMING THE OPTICAL FIBER

BACKGROUND OF THE INVENTION

The present invention relates to optical waveguides. More particularly, the present invention is directed toward forming optical waveguides from optical fibers, which are suitable for use in data communication.

To minimize insertion loss, the loss of optical energy when coupling data links in fiber-optic communication systems, it is important to correctly match the aperture through which optical energy is transmitted with the aperture through which optical energy is detected. As a result, the areas of the apertures must be correctly sized and aligned.

The ideal interconnection of one fiber to another would have two fibers that are optically and physically identical and held by a connector that aligns the fibers so that the interconnection does not exhibit any influence on light propagation therethrough. Formation of the ideal interconnect is difficult for several reasons. These include variations in fiber properties, tolerances in the connector, as well as in cost and ease of use.

Commercially available interconnection devices have typical insertion losses from between 0.2 dB to 4 dB. This range of insertion loss results from several factors that may be divided into those related to fibers and those related to interconnection devices. Fibers intrinsically contribute loss to an interconnection and any fiber has variations that are produced during manufacture. These variations exist not only among different lots of fibers, but also within a length of a single fiber, as well. The main variations in these cases are in the core and cladding diameters and fiber numerical aperture (NA). The core ellipticity, cladding ellipticity, and core-to-cladding eccentricity exacerbate the problems associated with variations in the core and cladding diameters. Losses caused by diameter variations, NA variations, eccentricity, and ellipticity are intrinsic to the fiber and the total loss contributed by these intrinsic factors can range from less than 0.2 dB to over 2 dB, depending on how well two fibers match.

Connector-related losses may also arise even when there are no intrinsic variations in the fibers. These types of losses arise when two fibers are not aligned on their center axes and lateral or axial displacement can be, and usually is, the greatest cause of loss in the connection. For example, a 0.5 dB loss that is due to a displacement, equal to 10% of the core diameter, will require tolerances to be maintained on each connector (fiber) that is within 2.5 $\mu$m. Tolerances of this magnitude are difficult to achieve. Add to this, the losses that are also induced due to angular misalignment, and the total tolerances that must be maintained in the termination process, proper fiber and/or connector end preparation becomes problematic.

The considerations discussed above with respect to fiber-to-fiber interconnections apply equally to fiber-source and fiber-detector interconnections, as well. The result is that the requirements that should be achieved to provide efficient optical coupling necessitate end-finishing or termination processes that strives to provide lossless propagation of optical energy. To that end, it is desired to provide the end of a fiber that functions as either a transmission or reception aperture with a smooth end finish free of such defects that may change the geometrical propagation patterns of optical energy passing therethrough. These defects include hackles, burrs, fractures, bubbles and other contaminants.

Preparation of conventional glass optical fibers employs score-and-break techniques or mechanical polishing techniques. The score-and-break technique provides an optical fiber with an arc that is scored. Tension is applied to that optical fiber so that the score propagates across the width of the optical fiber, segmenting the same. This technique is capable of producing an excellent cleaved end. Repeatability, however, it is difficult, lowering yields and increasing the cost of the finished optical fibers. In addition, a great amount of skill is required to properly control both the depth of the scoring and the amount of tension during breaking. The aforementioned control may be frustrated by intrinsic fiber variations. Finally, the difficulty in controlling both the depth of scoring and breaking tension increases as the length of the optical fiber becomes shorter.

Polishing, compared to scoring-and-breaking, has the advantage of consistent results, but is a much more costly technique. Polishing is typically performed after a connector, or ferrule, has been attached to the optical fiber. Polishing a bare optical fiber is impractical. Usually, a polishing fixture is provided that controls the polishing to a fixed dimension, e.g., usually within 0.3 $\mu$m.

Polymer-based optical fibers may be segmented with a sharp, and preferably hot, blade. As with the polishing technique mentioned above with respect to glass optical fibers, segmenting is performed on polymer-based optical fibers after a connector has been attached. Polymer-based optical fibers may also be polished, but it is very difficult to achieve the performance of a glass or quartz optical fiber.

In addition to providing a smooth end finish, the preparation procedure should provide the optical fiber with a cleaved end, i.e., the end of the optical fiber is typically planar and lies in a plane with the longitudinal axis of the optical fiber extending orthogonally thereto. Otherwise, an angle may exist between the axes of juxtaposed fibers and fiber-devices, referred to as tilting. Tilting can cause additional, and sometimes quite severe, losses in addition to those mentioned previously. While tilting loss can be controlled to some degree by proper end preparation and positioning of adjacent fiber ends, it should not be completely ignored. Often alignment mechanisms are employed to reduce the effects of tilting. Such alignment mechanisms include lenses that may be effectively coupled and aligned, (with minimum loss to the end of the optical fiber).

Figure 1:
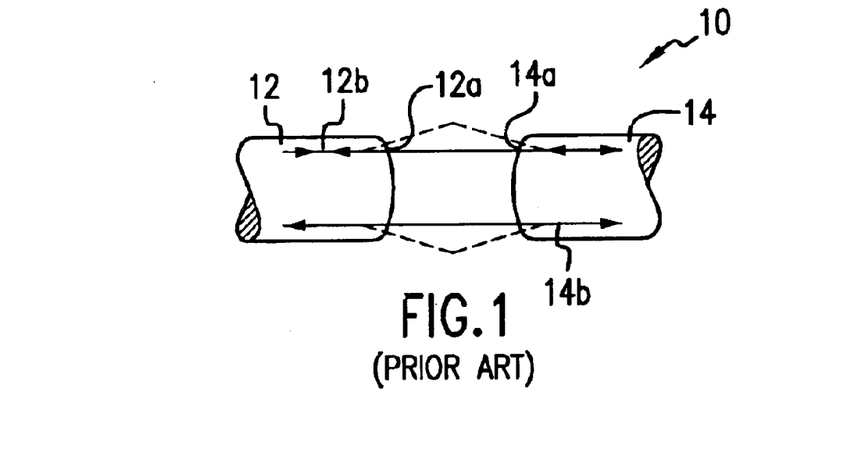
FIG. 1 is a perspective view showing coupling of optical energy between two spaced-apart optical fibers, according to the prior art.

Referring to FIG. 1, a fiber-to-fiber arrangement 10 employing lensed optical fibers 12 and 14 is shown. The lenses are shown as 12a and 14a, at the ends of optical fibers 12 and 14, respectively. Lenses 12a and 14a are typically spherical and refract optical energy, shown as 12b and 14b, propagating therethrough to facilitate control of the path of light therebetween. In this manner, the lateral and axial alignment between optical fibers 12 and 14 may be relaxed. However, optical fibers 12 and 14 should be accurately placed and aligned behind the lenses in order to actually see any real or significant benefits to the overall loss considerations (e.g., low losses). Moreover, such conditions are most often achieved without the aid of non-integral support elements such as lenses, when the appropriately prepared fiber ends are perpendicular to the fiber axis. One manner in which to form lenses 12a and 14a is discussed below with respect to a fiber-source arrangement.

Figure 2:
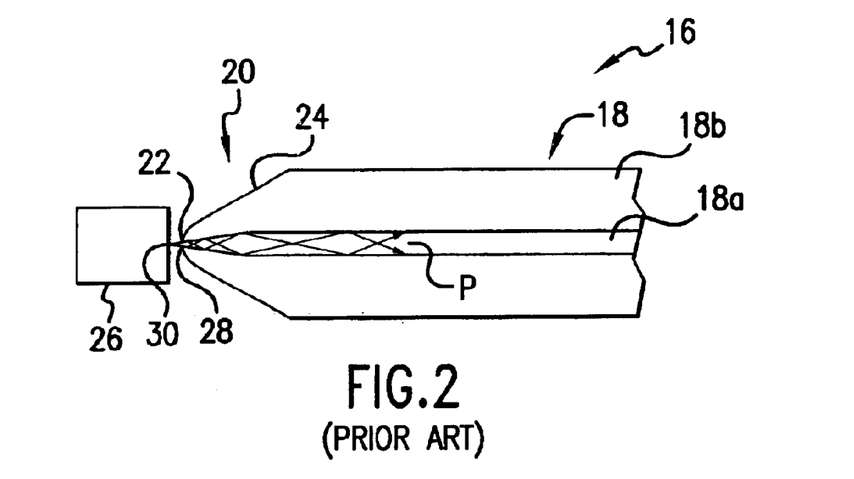
FIG. 2 is a simplified plan view of a source to fiber coupling arrangement of optical energy in accordance with the prior art.

Referring to FIG. 2, shown is a fiber-source arrangement 16 in which a lens 20 is formed on one end of an optical fiber 18. The source-fiber arrangement 16 includes an optical fiber 18 composed of a core 18a and a cladding 18b. A lens 20 is formed at an end of a fiber core. Were optical fiber 18 formed from silica glass, lens 20 would be formed in the following manner: First, while a portion of the silica glass optical fiber 18 is heated by heating means such as a burner, a tensile force is applied to the fiber in the longitudinal direction thereof, whereby the heated portion extends. When the outer diameter of the heated portion has decreased to a predetermined diameter, optical fiber 18 is cut at the diameter-reduced portion, and then the cut end is again heated for fusion. In the heating step, extreme end 22 of optical fiber 18, including core 18a in the center thereof, becomes spherical in shape due to surface tension, and this spherical end functions as a lens. Thus, lensed optical fiber 18 has a taper portion 24 extending from extreme end 22 to an outer peripheral edge, which is not affected by heat, and having a certain inclination determined by the heating and drawing conditions. Lensed optical fiber 18 produced in this manner is optically connected to a semiconductor laser 26, and a laser beam 28 is emitted from a light-emitting surface 30 of semiconductor laser 26. In this case, laser beam 28 radiates in conical form. Laser beam 28 is incident on extreme end 22 at the extremity of core 18a and is propagated through core 18a, as indicated by the arrows in FIG. 2, and is used for optical communications. A drawback with the prior art attempt of lens formation is that artifacts are produced by the thermal energy propagating through the optical fiber 18. These artifacts may lead to increased insertion loss.

What is needed, therefore, is a technique to thermally shape an optical fiber while reducing formation of artifacts.

SUMMARY OF THE INVENTION

Provided are a thermally-shaped optical fiber and a method for forming the same that features creating a flow of thermal energy between two spaced-apart regions of the optical fiber. The flux of thermal energy in the flow is substantially constant to define a graded index of refraction in a portion of the optical fiber located between said two-spaced apart regions. This minimizes formation of unwanted optical artifacts in the portion. For example, a graded index of refraction is formed in the portion, thereby avoiding abrupt changes in the variation of the index of refraction in the portion. Additionally, the formation of a self-focusing lens in the portion is minimized, if not abrogated. Both of the aforementioned optical artifacts, abrupt changes in indices of refraction and the self-focusing lens, leads to insertion loss. By avoiding formation of these optical artifacts, the insertion loss of the optical fiber is greatly reduced, if not completely absent.

DETAILED DESCRIPTION OF THE INVENTION

Figure 3:
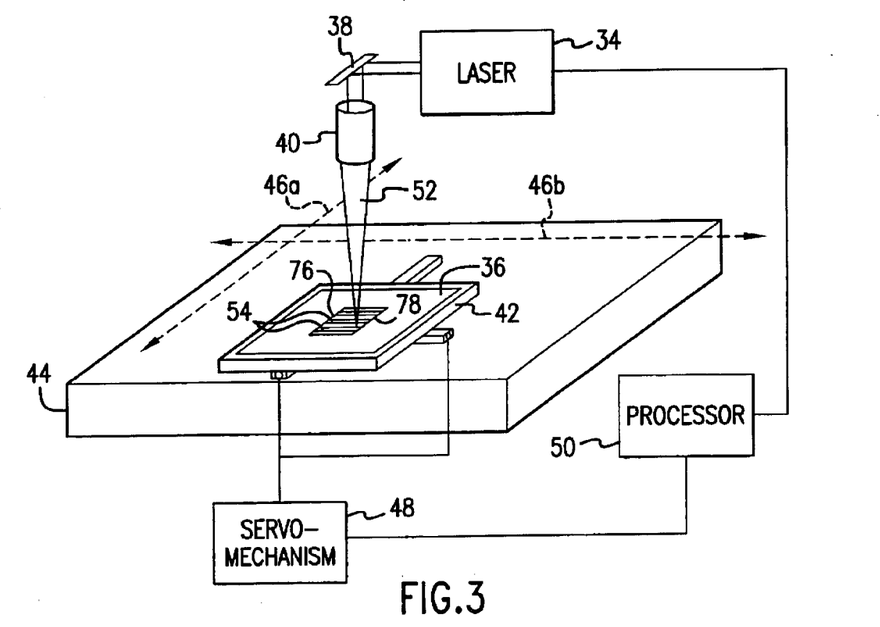
FIG. 3 is a simplified perspective view showing a laser shaping system in accordance with the present invention.

Referring to FIG. 3, an exemplary system 32 that is suitable for shaping optical fibers in accordance with the present invention is shown. The system 32 includes a laser source 34 in optical communication with a platen 36 through a pick-off mirror 38 and beam shaping optics 40. The platen 36 is attached to a stage 42 that is moveably attached to a frame 44. Specifically, stage 42 is moveably attached to the frame 44 to reciprocate along at least one axis 46a. Stage 42 may also be attached to move along an axis orthogonal to axis 46a, shown as 46b. To that end, a servo-mechanism 48, in data communication with a processor 50, is coupled to the stage 42 to facilitate movement along both axes 46a and 46b under control of the processor 50. In this manner, positional control along the axes 46a and 46b was achieved within 4 μm, with the laser source 34 being able to impinge a beam 52 upon any area of the platen 36, desired. In the present example, one or more optical fibers 54 are attached to platen 36 using any technique known in the art. The velocity of the stage 42 along either of axes 46a and 46b may be from stationary to 1 inch/sec or more. Beam 52 impinges upon the optical fibers 54 to segment and/or shape the same.

Although any type of laser may be employed, the present exemplary system employed laser manufactured by KERN Electronics and Lasers, Inc. Model # KER6X6-10 to provide basic 10 Watt $CO_2$ beam. Beam 52, therefore, comprises of infrared (IR) wavelengths of optical energy of sufficient power to segment optical fibers 54. The beam profile was adjusted dependent upon the segmentation technique employed, discussed more fully below. With this configuration, the dwell time, period of time in which a single fiber element is exposed to beam 52, can then be varied from less than a microsecond to more than a millisecond. In addition, manual, single pulse or continuous wave operation of laser source 34 was also made available.

Figure 4:
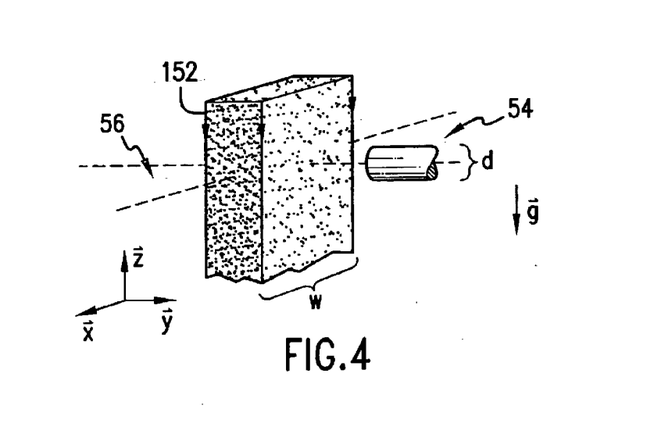
FIG. 4 is a perspective view of an optical fiber being exposed to thermal energy of a laser beam shown above in FIG. 3, in accordance with the present invention.

Referring to FIGS. 3 and 4, the type of cut and/or surface finish achieved on each of optical fibers 54 is a function, inter alia, the spatial proximity between beam 52 and optical fiber 54, as well as the beam energy to which optical fiber 54 is exposed. Specifically, it is shown that the plane in which the segmentation of optical fiber 54 occurs, cutting plane 56, extends in the $\vec{x}$ and $\vec{y}$ directions. Beam 152 propagates in the $\vec{z}$ direction to impinge upon cutting plane 56, while relative movement between optical fiber 54 and beam 152 parallel to the $\vec{x}$ direction occurs. In this arrangement, the energy distribution in beam 152 is substantially uniform throughout the cross-section thereof. With this beam profile 152, a two-step technique is employed to segment and polish the end of the core of optical fiber 54. To that end, beam 152 functions as a straight-edged thermal blade.

Figure 5:
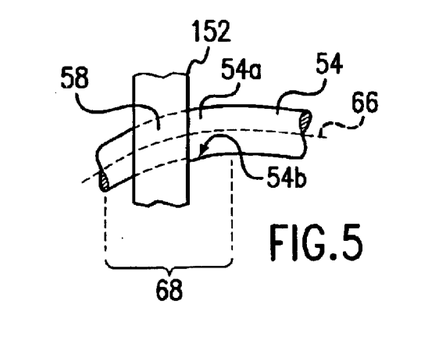
FIG. 5 is a detailed cross-sectional view of an optical fiber shown bending under force of gravity.

In the first step, beam 152 is provided with a sufficient amount of energy to propagate through the optical fiber 54 to segment both the cladding and core of the same. The energy of beam 152 to achieve segmentation was found to be in the range of 20% to 30% of total power available from laser source 34, dependent upon the type of material that beam 152 has to segment. The width "w" of beam 152 is approximately 1.25–1.4 times greater than the core diameter "d". When exposed to the thermal energy of beam 152, the core of optical fiber 54 underwent a plurality of phase-changes in which the solid core becomes a viscous liquid and a gas. Specifically, as shown in FIG. 5, portion 58 of optical fiber 54 exposed to beam 152 undergoes two phase-changes with some of the material associated therewith vaporizing and the remaining material becoming molten. Regions 54a and 54b of optical fiber 54 that are in close proximity with beam 152 also become molten.

Figure 6:
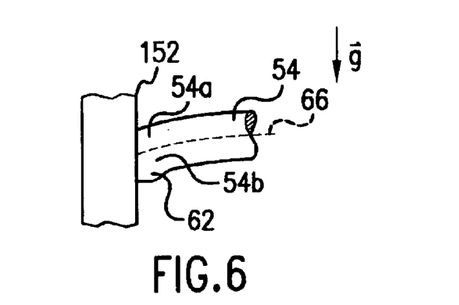
FIG. 6 is a cross-sectional view of the optical fiber shown above in FIG. 5 with sag.

Referring to FIGS. 3, 5 and 6, while in the molten state the core material moves under force of gravity, $\vec{g}$, and accumulates proximate to region 54b, forming a protrusion 62. The formation of protrusion 62 is typically referred to as sag. The amount of sag may be controlled, in part, by selecting an appropriate dwell time. For a fixed amount of energy in beam 152 the dwell time is set by the velocity of stage 42. Stage 42 velocity is between 0.2 and 0.5 inch/second, dependent upon the cross-sectional area of optical fiber 54 being segmented. It was found, however, that regulation of the dwell time, alone, was insufficient to substantially reduce, if not eliminate the sag. Rather, the sag that occurs in the molten state is minimized and/or eliminated by stiffening optical fiber 54 so that the same does not bend under force of gravity, $\vec{g}$.

Figure 7:
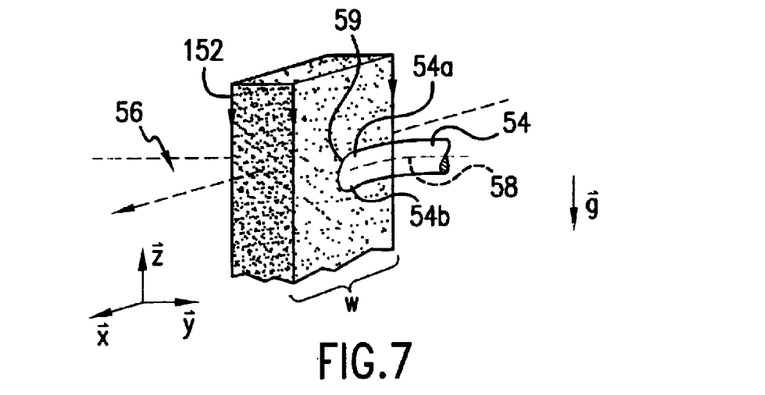
FIG. 7 is a detailed perspective view of the fiber shown above in FIG. 5.
Figure 8:
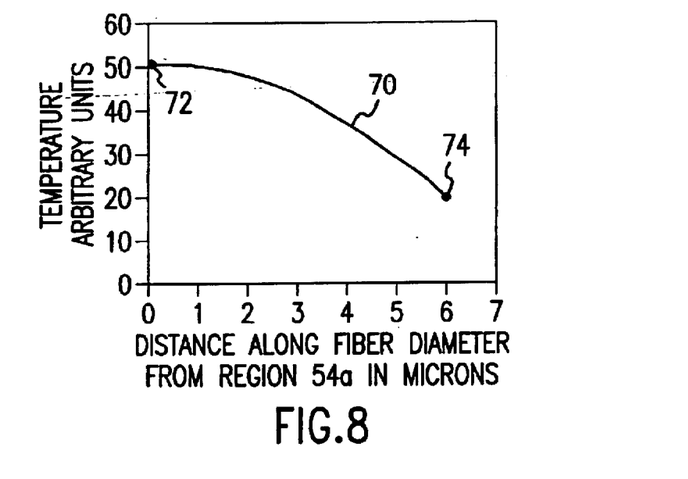
FIG. 8 is a graph showing the difference in the temperature over the diameter of the optical fiber shown above in FIGS. 5, 6 and 7.

As shown in FIGS. 5 and 7, it was found that the sag was the result of optical fiber 54 bending upon force of gravity, $\vec{x}$, during segmentation. Specifically, without stiffening optical fiber 54, longitudinal axis 66 associated with a subportion 68 of optical fiber 54 forms an oblique angle with respect to gravity $\vec{g}$. As a result, when beam 152 segments optical fiber 54, a temperature gradient develops between opposing regions 54a and 54b of optical fiber 54. Region 54a heats faster and therefore, reaches a higher temperature, than region 54b. This results in uneven heat propagation through optical fiber 54. As a result, for a brief period of time, the end of optical fiber 54 will concurrently have two phase-states present. When beam 152 initially impinges upon optical fiber 54, region 54a becomes molten while region 54b maintains a solid state. As heating continues, the end of optical fiber 54 proceeds to a homogenous phase state of a viscous liquid. However, due to a temperature gradient present in optical fiber 54, a much greater amount of molten material is present in region 54a than is present in region 54b. An exemplary thermal profile of optical fiber 54 is shown by curve 70 in FIG. 8. As shown by curve 70, the temperatures of region 54a, shown as point 72, may be 2.5 times greater than the temperature at region 54b, shown as point 74. This temperature gradient produces sag.

Referring to FIGS. 3, 5 and 7, to reduce the sag produced during segmentation, it is ensured that longitudinal axis 66 associated with subportion 68 exposed to the beam 152 extends transversely to gravity $\vec{g}$. To that end, opposing regions 76 and 78 of optical fiber 54 are securely affixed to a rigid surface, such as platen 36, using any suitable means known in the art. Portion 58 is located between regions 76 and 78. This has been found to substantially reduce, if not eliminate sag.

Subsequent to segmenting optical fiber 54, the energy in beam 152 is reduced to be 30% or less of the energy employed to segment optical fiber 54, while maintaining the same beam width. Optical fiber 54 is then exposed to the thermal energy of beam 152 so as to minimize the dwell time. This may be achieved by first having optical fiber 54 thermally insulated from beam 152. Then movement between optical fiber 54 and beam 152 in a direction parallel to the $\vec{x}$ axis is undertaken. In this manner, the dwell time is on the order of a few microseconds. During the dwell time, end 59 of optical fiber 54 rapidly undergoes two phase-changes before any sag occurs: solid to a viscous liquid and viscous liquid to a solid. This allows the end 59 of optical fiber 54 to reflow, thereby providing a smooth surface, while avoiding the effects of gravity when optical fiber 54 is placed in the molten state for too long a period of time. This results in a fire polish of end 59 with surface anomalies of 50 nm or less, while minimizing curvature. The depth of refractive action within optical fiber 54 itself due to the curvature itself is minimal at less than 1 μm, which is considered as a perpendicular cut and polish.

It should be understood, that the polishing step may be achieved by movement between optical fiber 54 and beam 152 along a direction parallel to the $\vec{y}$ axis. In this manner, beam 152 is initially collinear with optical fiber 54, but spaced-apart a sufficient distance to be thermally insulated from the optical fiber 54. After, beam 152 and optical fiber 54 are positioned collinearly, rapid movement along the $\vec{y}$ axis is facilitated to expose optical fiber 54 to the thermal energy of beam 152, while minimizing dwell time for the reasons discussed above.

Figure 9:
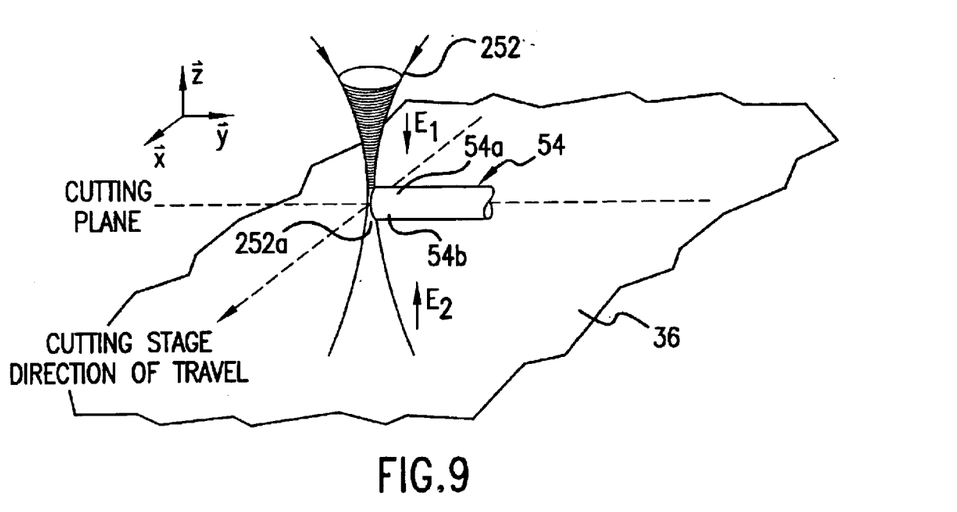
FIG. 9 is a perspective view of the optical fiber being segmented with a laser beam in accordance with an alternate embodiment of the present invention.

Referring to FIG. 9 in another embodiment, a single step may be employed to segment optical fiber 54 and polish the resulting end 59 thereof. To that end, beam 252 includes a narrow waist 252a that is disposed proximate to optical fiber 54. In this fashion, beam 252 functions as a thermal scalpel, with waist 252a having a greater energy per unit area than the remaining regions of beam 252. This beam profile presents, to optical fiber 54, a thermal wavefront having a high temperature gradient, which exacerbates control of sag. This thermal wavefront results in uneven heat propagation through optical fiber 54. The uneven heat propagation produces a temperature gradient in optical fiber 54, whereby one region of optical fiber 54a is heated to a greater temperature than an opposing region 54b. As a result, for a brief period of time, the end of optical fiber 54 will concurrently have two phase-states present. Specifically, when beam 252 initially impinges upon optical fiber 54, the region 54a becomes molten while the region 54b maintains a solid state. As heating continues, the end of optical fiber 54 proceeds to a homogenous phase state of a viscous liquid. However, due to the temperature gradient present in optical fiber 54, a much greater amount of molten material is present in region 54a than is present in region 54b. This temperature gradient present in optical fiber 54 frustrates control of the shaping of the end due to the presence of sag.

Figure 10:
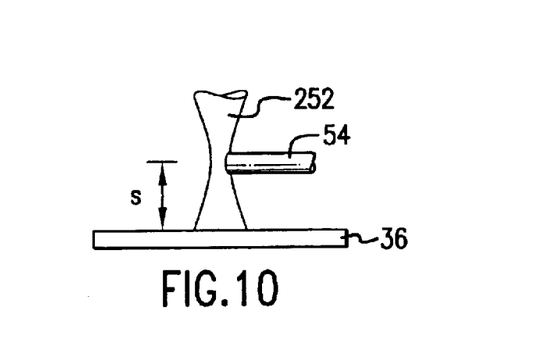
FIG. 10 is a side-sectional view of the optical fiber and laser beam shown above in FIG. 9 demonstrating a beam focus proximate to the optical fiber rests and spaced apart from a platen.

Referring to FIGS. 9 and 10, to reduce, if not eliminate, the temperature gradient between regions 54a and 54b, platen 36 is selected to be thermally reflective. In this manner, thermal energy $E_1$ and $E_2$ propagates along a direction parallel to the $\vec{z}$ axis to impinge upon optical fiber 54 from opposite directions. In one direction, thermal energy $E_1$ from beam 252 impinges upon region 54a. A portion of thermal energy $E_1$ is reflected from platen 36 in the form of reflected thermal energy $E_2$ to impinge upon region 54b. To that end, a spacing, "s" between waist 252a and platen 36 is chosen to ensure that the flux of reflected energy $E_2$ impinging upon region 54b results in a temperature difference between regions 54a and 54b, t, that is approximately zero. The exact spacing, s, is dependent upon the reflecting surface, the diameter of optical fiber 54 and the temperature gradient presented by beam 252. As a result, waist 252a may be positioned above or below the cutting plane.

Figure 11:
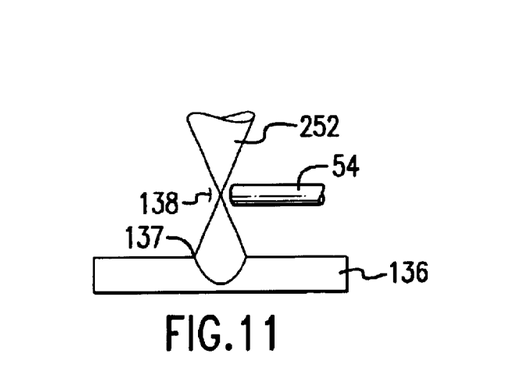
FIG. 11 is a cross-sectional view of the optical fiber and laser beam shown above in FIG. 10 with a platen having a curved surface, in accordance with an alternate embodiment of the present invention.

Referring to FIG. 11, in an alternative embodiment, a parabolic reflective surface 137 may be employed that may be formed integrally with platen 136. Alternatively, an additional body (not shown) may be disposed between platen 136 and optical fiber 54 that is thermally reflective and defines a parabolic surface. Parabolic reflective surface 137 defines a focus 138 and optical fiber 54 would be positioned proximate to focus 138. In this manner greater control of the flux of thermal energy $E_2$ that impinges upon optical fiber 54 may be obtained.

Figure 12:
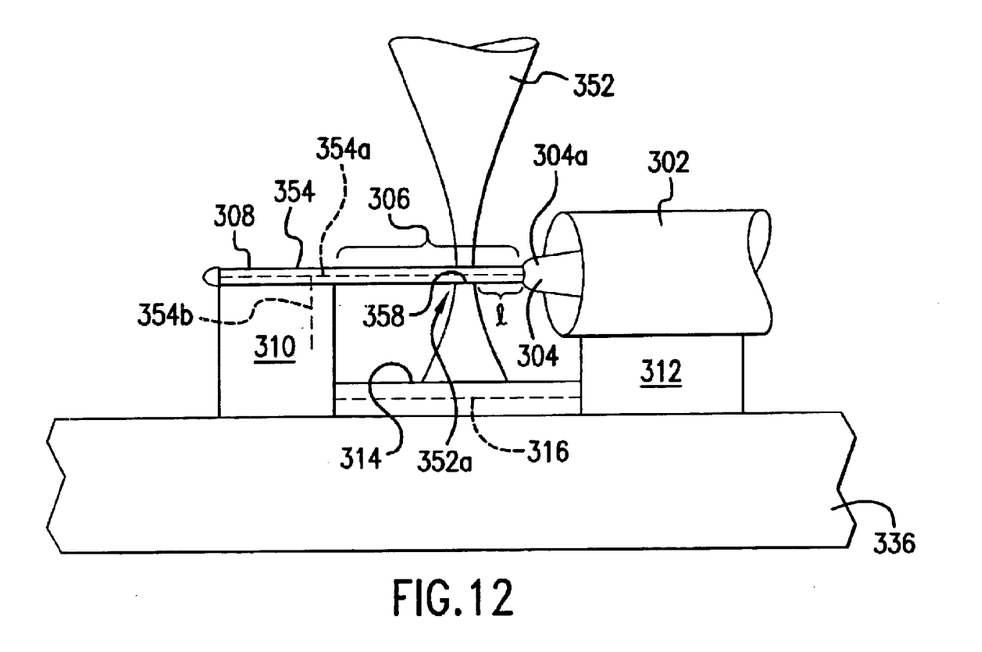
FIG. 12 is a detailed view showing the mounting arrangement of an optical fiber disposed in a connector to be segmented by the system shown above in FIG. 3.

Referring to FIG. 12, optical fiber 354 that is to be segmented is typically mounted in a connector 302 that includes a ferrule 304 and has had the cladding (not shown) removed. Ferrule 304 may be made from any suitable material to dissipate thermal energy propagating along optical fiber 354, such as ceramic and polymer. Optical fiber 354 is typically fixed to ferrule 304 using any suitable adhesive, such as epoxy. Section 306 of optical fiber 354 that is to be segmented extends from ferrule 304, proximate to region 304a terminating in an end 308. End 308 is mounted to a first mechanical support 310, and connector 302 is mounted to a second mechanical support 312. First 310 and second 312 mechanical supports rest against platen 336, with section 306 being spaced-apart therefrom. Extending beneath section 306 is a thermally reflective body 314 that includes a recess defining a curved surface, the nadir of which is shown by dotted line 316.

In this arrangement, typically a beam having a narrow waist 352a is employed, as discussed above, with waist 352a of beam 352 being focused proximate to optical fiber 354, shown in FIG. 12. Considerations when segmenting optical fiber 354 concern providing a sufficient length, l, between region 358 to be vaporized by beam 352 and region 304a. Specifically, the length, l, should be sufficient to ensure dissipation of thermal energy propagating through optical fiber 354 does not damage ferrule 304. In addition, the length, l, should be sufficiently short to facilitate efficient coupling of the connector/fiber combination with another connector/fiber combination while providing a fiber-to-fiber interface.

Length, l, was found to be determined on numerous factors, such as the material from which optical fiber 354 was formed, the heat dissipation characteristics of ferrule 304 and the thermal flux transferred to optical fiber 354 from beam 352. Specifically, it was found that by creating a flow of thermal energy between two spaced-apart regions, such as region 358 and region 304a, the flux of which is substantially constant, abrupt changes in the index of refraction over the length, l, of optical fiber 354 may be reduced, if not avoided. The constant flux of thermal energy in the flow results in the formation of a graded index of refraction over length, l, between spaced apart regions 358 and 304a, i.e., the index of refraction changes linearly over length, l. In addition to minimizing formation of abrupt changes in the index of refraction, a self-focusing lens formation is also reduced. Both of the aforementioned optical artifacts exacerbate insertion loss.

Figure 13:
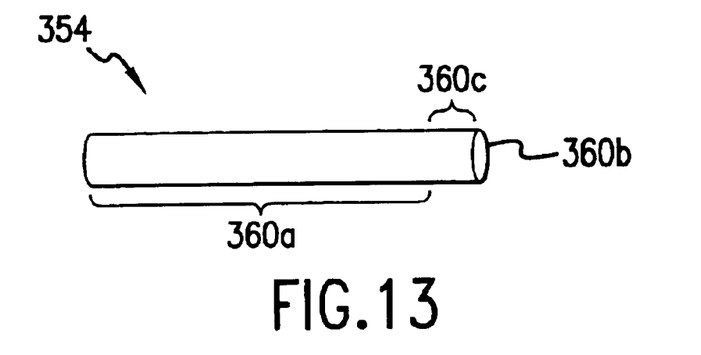
FIG. 13 is a simplified plan view of an optical fiber core segmented in accordance with one embodiment of the present invention.
Figure 14:
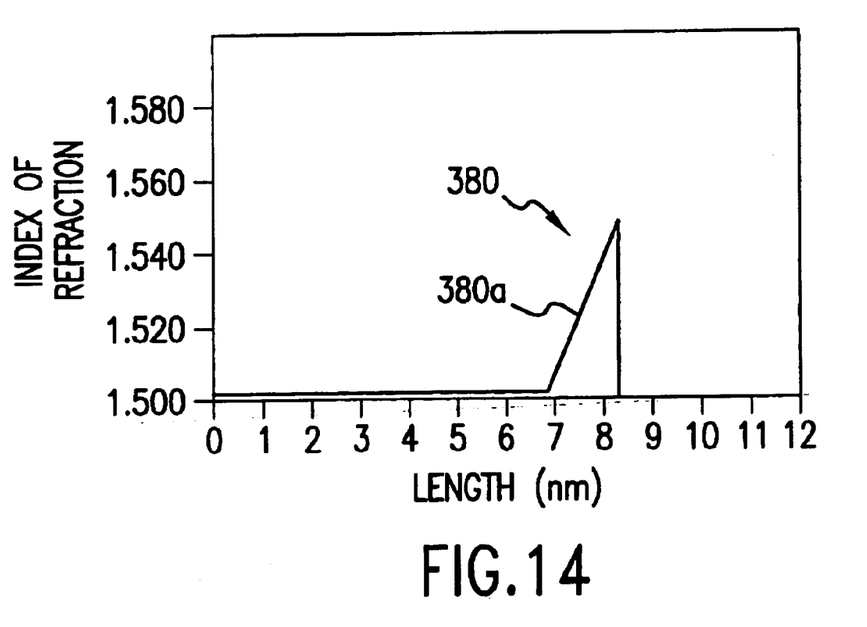
FIG. 14 is a graph showing the change of the index of refraction of the optical fiber shown in FIG. 13 over the length.

Referring to FIG. 13, formation of optical fiber 354 in accordance with one embodiment of the present invention provides optical fiber 354 having three regions 360a, 360b and 360c with differing indices of refraction. Assuming in the present example that optical fiber 354 is formed from glass, region 360a may have an index of refraction measuring approximately 1.502. At region 360b, a lens is formed having a differing index of refraction, measuring approximately 1.550. To minimize reflection of optical energy propagating along region 360a into region 360b, region 360c is formed to have a graded index of refraction that changes linearly between region 360a and 360b. This is shown by the linear slope of region 380a of curve 380 of FIG. 14. The benefit of providing a linear change in the index of refraction in region 360c is that insertion loss of optical energy propagating from region 360a to region 360b is minimized.

The manner in which it was determined that a graded index of refraction was produced and, therefore, that the flux of thermal energy between spaced-apart regions 358 and 304a occurred, was by use of Optical Frequency Domain Reflectometry (OFDR). Specifically, an Optical Frequency Domain Reflectometer of the type available from the Group of Applied Physics University of Geneva, Geneva, Switzerland [hereinafter referred to as GAP-Optique] was employed to measure the optical power propagating along optical fiber 354. Optical Frequency Domain Reflectometry measures back reflections from optical fibers and provides the advantages in that greater spatial resolution and sensitivity is provided than that provided by the standard Optical Time Domain Reflectometry (OTDR).

Figure 15:
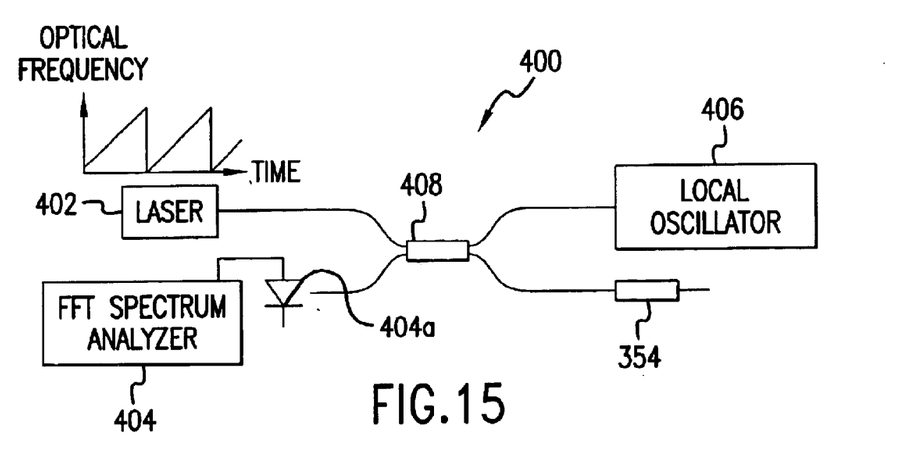
FIG. 15 is a simplified plan view of an optical frequency domain reflectometer system used in accordance with one embodiment of the present invention to measure the optical energy reflected in an optical fiber shown in FIGS. 16 and 17.

Referring to FIG. 15, OFDR, in accordance with the present invention, included the prototype Optical Frequency Domain Reflectometer available from GAP-Optique. The GAP-Optique Reflectometer system 400, used in accordance with one embodiment of the present invention, includes a laser source 402, a fast Fourier transform spectrum analyzer 404 having a photo detector 404a in data communication therewith, a local oscillator (LO) 406 all in optical communication with optical fiber 354 through an interferometer 408. Laser source 402 produces optical energy that propagates through interferometer 408 to impinge upon both LO 406 and optical fiber 354. LO 406 beats the optical energy impinging thereupon with a suitable frequency to produce a fixed Fresnel reflection. Back reflections from optical fiber 354 propagates through interferometer 408, producing back reflections beat with the fixed Fresnel reflection that are sensed by detector 404a. Laser source 402 is swept to produce a light over a range of optical frequencies so that reflections from points at different distances along optical fiber 354 correspond to different beat frequencies on detector 404a. Detector 404a produces signals in response to the optical frequency sense that are Fourier transformed, and analyzed in the frequency domain by spectrum analyzer 404. As a result, each frequency corresponds to a particular distance in optical fiber 354.

Figure 16:
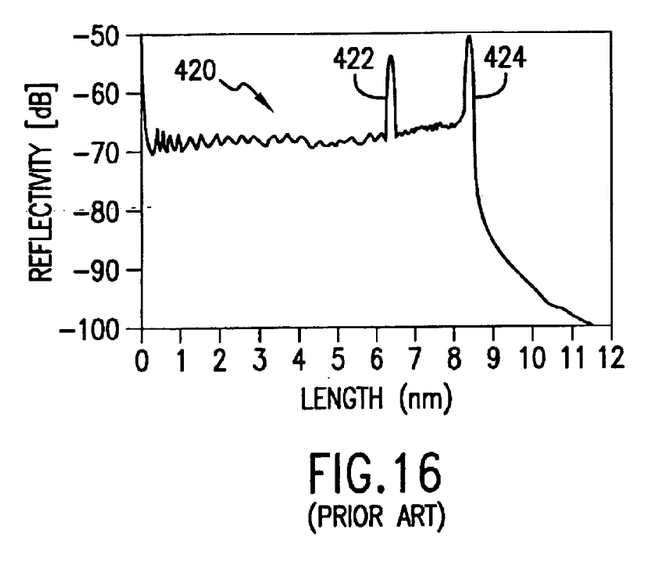
FIG. 16 is a graph showing reflected optical energy vs. length of optical fiber in accordance with an optical fiber segmented in accordance with the prior art.

Referring to FIGS. 13, 15 and 16, using system 400, the reflection characteristics of optical fiber 354 are measured to ensure that a graded index is provided in region 360c, shown by curve 420. Curve 420 shows the reflection of optical energy along a length of a fiber not formed in accordance with the present invention. Curve 420 includes two peaks 422 and 424. Peak 424 corresponds to lens-air interface where the index of refraction undergoes an abrupt change. Peak 422 corresponds to lens-fiber interface, located proximate to region 360c, which is an undesirable characteristic that the present invention overcomes. This is shown with respect to FIG. 17 in which curve 520 includes only one peak 524.

Figure 17:
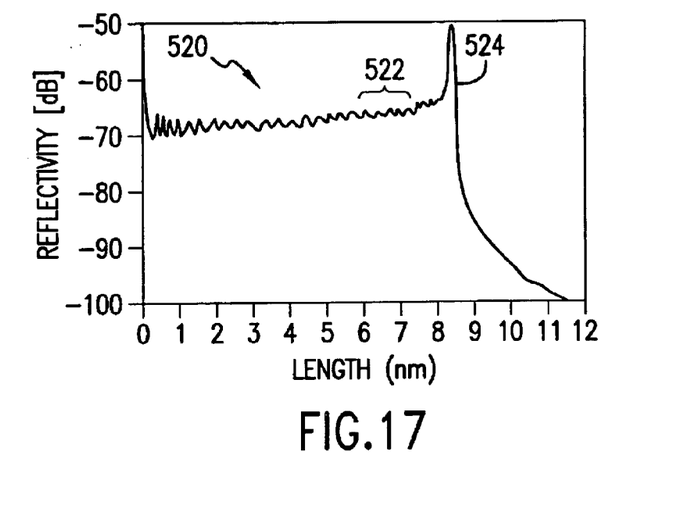
FIG. 17 is a graph showing reflected optical energy vs. length of optical fiber in accordance with an optical fiber segmented in accordance with one embodiment of the present invention.

Referring to FIGS. 15 and 17, curve 520 corresponds to the reflection loss of a fiber formed in accordance with the present invention. Peak 524 corresponds to the lens-air interface. Region 522 corresponds to the fiber-lens interface. As seen, the reflectivity in region 522, compared to the reflectivity of regions adjacent thereto, does not demonstrate an abrupt change. Rather, the reflectivity in this region of optical fiber 354 does not show a substantial loss in signal strength due to reflectivity. This corresponds to the presence of a graded index of refraction in this region of fiber, thereby result in deminimus insertion loss of optical energy propagating from the fiber and into the lens.

Figure 18:
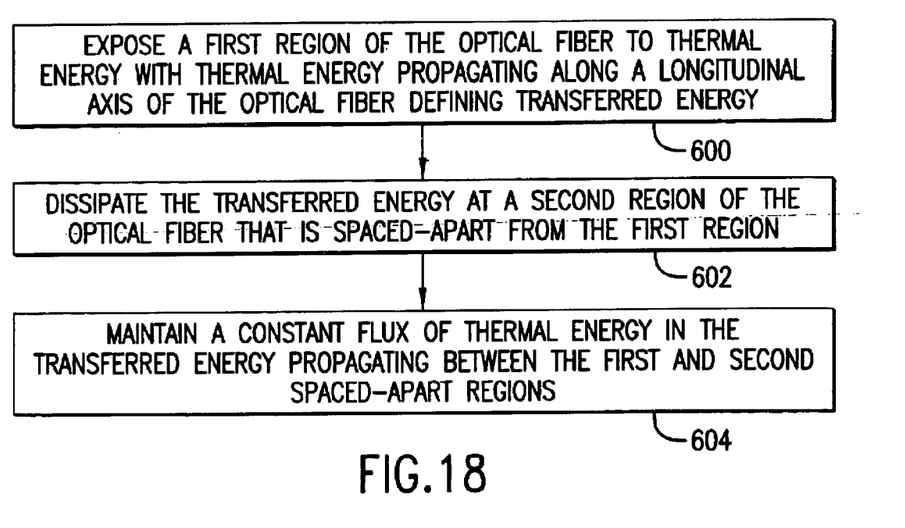
FIG. 18. is a flow diagram showing a method of thermally-shaping optical fibers in accordance with one embodiment of the present invention.

Referring to FIGS. 12 and 18, to avoid formation of these optical artifacts, a method for thermally shaping optical fiber 354 includes, at step 600, exposing a first region, such as region 358, of the optical fiber 354 to thermal energy, such as beam 352. A portion of the thermal energy in beam 352 propagates along a longitudinal axis 354a of optical fiber 354, defining transferred energy. At step 602, the transferred energy is dissipated at a second region of optical fiber 354, such as region 304a, which is spaced-apart from region 358. Thermal energy passing between regions 358 and 304a form a flow. At step 604, thermal transfer between regions 358 and 304a is maintained to be a constant flux of thermal energy. To that end, beam 352 is established to have a constant thermal profile while impinging upon optical fiber 354, i.e., the variances in thermal energy provided by beam 352 is minimized. Additionally, dissipation of optical energy at region 304a occurs in two orthogonal directions, parallel to longitudinal axis 354a and radially away therefrom in direction 354b. In the present embodiment, the transferred thermal energy is removed from optical fiber 354 at region 304a radially symmetrically about the longitudinal axis 354a, as well as longitudinally. The advantage of removing thermal energy from optical fiber 354 in this fashion is manifold. Firstly, it provides the graded index of refraction, as mentioned above. This is useful when lensing an end of optical fiber 354, proximate to region 358 as discussed above. The index of refraction may be adjusted so that it varies, linearly over length, l, merely 4%, with the aforementioned lens having a maximum value of the index of refraction and the optical fiber 354 located proximate to region 304a having a minimum value. In one example, optical fiber 354 was manufactured from glass and had an index of refraction of approximately 1.502 at region 304a. At region 358 optical fiber 354 has an index of refraction of approximately 1.550. A second benefit of removing thermal energy from optical fiber 354 in two differing orthogonal directions is that it affords removing thermal energy at a sufficient rate to reduce, if not prevent, formation of a self-focusing lens in optical fiber 354. As a result, the insertion loss of optical fiber 354 is substantially reduced.

It is seen that shaping of optical fibers in accordance with the present invention, facilitates concurrently segmenting, polishing and lensing of the optical fiber while avoiding unwanted optical artifacts. Thus, the optical fibers may be quickly and easily shaped to minimize insertion loss.

Moreover, there are other arrangements that may be employed that would fall within the scope of the present invention. As stated above, virtually any type of thermal beam source may be employed, e.g., an Ultra Violet laser such as an Excimer may be employed. Therefore, the scope of the invention should not be based upon the foregoing description. Rather, the scope of the invention should be determined based upon the claims recited herein, including the full scope of equivalents thereof.

What is claimed is:

1. A method for forming an optical waveguide from an optical fiber having a longitudinal axis, said method comprising:

exposing a first region of said optical fiber to thermal energy, with a portion of said thermal energy being transferred to said optical fiber, defining transferred energy;

dissipating said transferred energy at a second region of said optical fiber, with said first and second regions being spaced-apart, with thermal energy passing between said first and second spaced-apart regions forming a flow; and maintaining, in said flow, a constant rate of thermal transfer between said first and second spaced-apart regions, thereby providing a graded index of refraction in a portion of said optical fiber located between said first and second spaced-apart regions.

2. The method as recited in claim 1 wherein dissipating further includes removing said transferred energy from said optical fiber in a direction that extends radially with respect to said longitudinal axis.

3. The method as recited in claim 1 wherein dissipating further includes transferring said transferred energy away from said optical fiber radially symmetrically about said longitudinal axis.

4. The method as recited in claim 1 wherein said index of refraction changes approximately 4% between said first and second spaced-apart regions.

5. The method as recited in claim 1 wherein maintaining further includes avoiding variances in said thermal energy being transferred to said optical fiber proximate to said first region and avoiding variances in a rate of dissipation of said transferred thermal energy.

6. The method as recited in claim 1 further including segmenting said optical fiber proximate to said first region.

7. The method as recited in claim 6 wherein segmenting said optical fiber further includes forming a lens proximate to said first region, with said portion extending from said second region, toward said first region, terminating in a lens.

8. The method as recited in claim 1 wherein exposing said optical fiber further includes impinging a beam of infrared energy upon said optical fiber from a first direction and reflecting a subportion of said infrared energy to impinge upon said optical fiber from a second direction, with said second direction disposed opposite to said first direction.

9. The method as recited in claim 8 wherein a said subportion has a magnitude associated therewith, which is dependent upon a mode associated with said optical fiber.

10. A method for controlling optical properties of an optical fiber having a longitudinal axis, said method comprising:
  creating a flow of thermal energy between two spaced-apart regions of said optical fiber, with a flux of said thermal energy in said flow being substantially constant to define a graded index of refraction in a portion of said optical fiber located between said two-spaced apart regions.

11. The method as recited in claim 10 wherein said creating further includes exposing said first region of said optical fiber to said thermal energy, with a portion of said thermal energy being transferred to said optical fiber, defining transferred energy and dissipating said transferred energy at a second region of said optical fiber.

12. The method as recited in claim 11 wherein dissipating further includes transferring said transferred energy radially symmetrically away from said optical fiber.

13. The method as recited in claim 12 wherein exposing said optical fiber further includes impinging a beam of infrared energy upon said optical fiber from a first direction and reflecting a subportion of said infrared energy to impinge upon said optical fiber from a second direction, with said second direction disposed opposite to said first direction.

14. The method as recited in claim 13 wherein said subportion has a magnitude associated therewith, which is dependent upon a mode associated with said optical fiber.

15. The method as recited in claim 1 further including segmenting said optical fiber proximate to said first region to form a lens, with said portion extending from said second region, toward said first region, terminating in said lens.

16. An optical waveguide, comprising:
  an optical fiber having an interface region and an end region; and
  a lens integrally formed to said interface region, with said interface region being disposed between said end region and said lens, said end region and said lens each having a constant index of refraction and said interface region defining an axially varying graded index of refraction.

17. The optical waveguide as recited in claim 16 wherein said graded index of refraction has a maximum value at said lens and a minimum value at said end region.

18. The optical waveguide as recited in claim 17 wherein said graded index of refraction has a median value, with said maximum value being approximately 2% greater than said median value and said minimum value being approximately 2% less than said median value.

19. The optical waveguide as recited in claim 16 wherein said lens is a convex lens.

20. The optical waveguide as recited in claim 16 wherein said lens is a concave lens.

* * * * *